Nov. 5, 1963 D. R. HOLCOMB 3,109,934

BI-STABLE CIRCUIT

Filed June 30, 1959

INVENTOR.
DON R. HOLCOMB,
BY
Walter J. Adam
ATTORNEY.

United States Patent Office 3,109,934
Patented Nov. 5, 1963

3,109,934
BI-STABLE CIRCUIT

Don R. Holcomb, Los Angeles, Calif., assignor to Hughes Aircraft Company, Culver City, Calif., a corporation of Delaware Filed June 30, 1959, Ser. No. 824,039
10 Claims. (Cl. 307—88)

This invention relates to bi-stable memory devices and, particularly, to a device utilizing diodes having non-linear characteristics to provide an alternating signal at either one of two desired phase conditions.

In the prior art, computers have been found to be relatively slow in operation because of the response times of vacuum tubes, transistors and diodes. For faster operation, the use of radio frequency signals has been proposed with digital information being represented by different phases of the signals. In this type of a computer system utilizing high frequency signals, conventional binary storage elements such as flip-flop circuits are not applicable. A device which simply and reliably stores phase information in response to an input signal of a desired informational phase would be very valuable to the computer art, and to other arts. A bi-stable device which utilizes elements having non-linear characteristics has the advantages that it would operate at very high frequencies, that it operates with a minimum of delay, and that it receives energy from its driving source to provide amplification.

It is, therefore, an object of this invention to provide a bi-stable memory device which may be utilized to store phase information in computers or other devices operating with radio frequency signals.

It is a further object of this invention to provide a bi-stable storage device which develops an output signal at either a first or a second phase condition, corresponding in phase to an informational input signal.

It is a still further object of this invention to provide a bi-stable device which utilizes diodes having non-linear characteristics to provide an alternating signal at either a first or a second phase, each of which represents a binary state of digital information.

It is another object of this invention to provide a bi-stable device which provides amplification of the information signal from a signal from a driving source and develops and sustains an informational signal which is at the same frequency or at a desired sub-harmonic frequency of the signal from the driving source.

Briefly, this invention is a bi-stable signal generating circuit utilizing elements having non-linear capacitance characteristics to develop signals at the same phase and frequency as an informational signal applied thereto. The circuit includes a first and a second reactance circuit each having one end connected to a common junction point with each reactance circuit including a first and a second diode connected either in an anode to anode or cathode to cathode arrangement or in a parallel arrangement. A driving source is connected to the other end of each reactance circuit so as to supply driving signals thereto, one driving signal being 180 degrees out of phase from the other. The common junction point is connected to an output lead and to a tank circuit which is tuned to a desired frequency such as the frequency of the driving source. The common point which is maintained at a balanced voltage state in response to the driving signal is unbalanced when the tank circuit develops voltage oscillations in response to an informational signal. The informational signal may be applied to the tank circuit prior to the time of applying the signals from the driving source to the reactance circuits. The voltage variations developed by the tank circuit control the reactance circuits to form a negative conductance looking into the reactance circuits from the tank circuit. Current signals flow between the tank circuit and the reactance circuit and energy is transferred from the driving source to the tank circuit to sustain the signal oscillations therein. The current signals are at a sub-harmonic frequency of the capacitance variation rate as determined by the tank circuit and at harmonics of that sub-harmonic frequency. The current signals develop output voltage signals at the tuned frequency of the tank circuit. The signal developed by the tank circuit is in phase with the informational signal which may be either at a first phase or a second phase 180 degrees out of phase from the first, each phase representative of a binary state of information.

The novel features which are believed to be characteristic of the invention, both as to its organization and method of operation, together with further objects and advantages thereof, will be better understood from the following description considered in connection with the accompanying drawing in which like characters refer to like parts and in which.

Figures 1, 2, 3, 4:
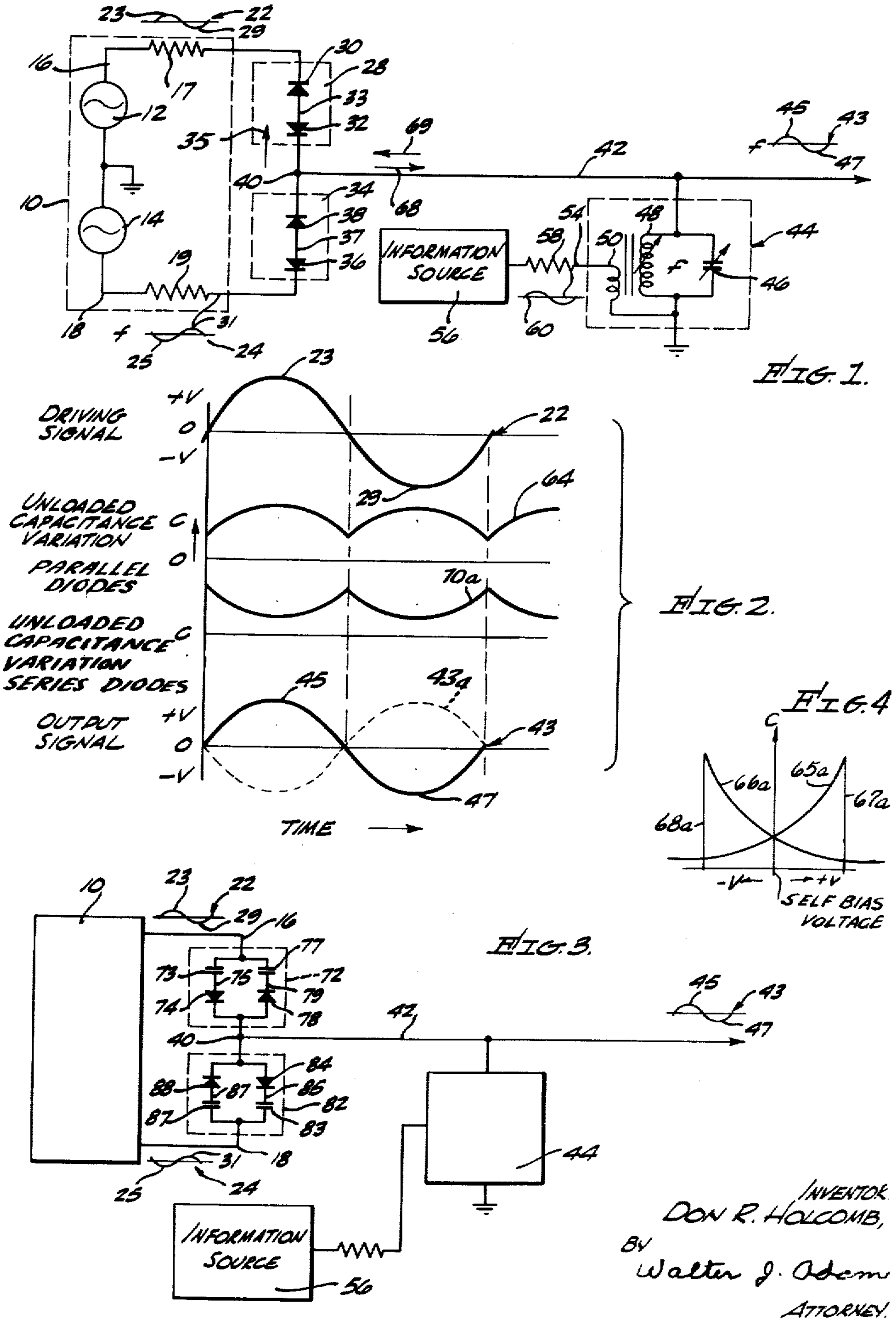
FIG. 1 is a schematic circuit diagram of the bi-stable device of this invention.
FIG. 2 is a diagram of waveforms for explaining the operation of FIG. 1 showing the driving voltage signal, the capacity variation, the total current signal on the output lead, and the output voltage developed on the output lead, all as a function of time.
FIG. 3 is a schematic circuit diagram of an additional arrangement of the diodes to form the reactance circuits of FIG. 1.
FIG. 4 is a diagram of capacitance versus voltage showing the variation of capacitance in the reactance circuits of FIGS. 1 and 3 with applied driving voltage.

Referring first to FIG. 1 which shows a schematic circuit diagram of the bi-stable device in accordance with this invention, the arrangement of the elements in the circuit will be explained. A driving source 10 is provided including a first generator 12 and a second generator 14 connected in a push-pull arrangement, with the generators 12 and 14 each referenced to ground. The generator 12 is connected to a driving signal lead 16 and the generator 14 is connected to a driving signal lead 18 to which the generators supply driving signals at the same frequency but 180 degrees out of phase from each other as respectively shown by the waveforms 22 and 24.

The driving signal lead 16 is connected from the generator 12 to a first variable reactance circuit 28 by way of a resistor 17 and the driving signal lead 18 is connected from the generator 14 to a second variable reactance circuit 34 by way of a resistor 19. The resistor 17 represents the inherent source resistance of the generator 12 and the resistor 19 represents the inherent source resistance of the generator 14. The first variable reactance circuit 28 includes diodes 30 and 32 and the second variable reactance circuit 34 includes diodes 36 and 38. The diodes 30, 32, 36 and 38 have non-linear capacitance characteristics and are semiconductor devices, for example.

The diode 30 has a cathode coupled to the driving signal lead 16 and an anode coupled to an anode of the diode 32 by a lead 33. The cathode of the diode 32 is connected to a junction point 40. The diode 36 has a cathode connected to the driving signal lead 18 and an anode connected to an anode of the diode 38 by a lead 37. The diode 38 has a cathode connected to the junction point 40. Thus, as will be explained subsequently, the capacitance of the diodes of the reactance circuits 28 and 34 varies in a non-linear manner in response to the driving signals of the waveforms 22 and 24. Although the diodes in each reactance circuit 28 and 34 are connected anode to anode in FIG. 1, it is to be noted that in one or both of the reactance circuits, the diodes may be connected cathode to cathode, as will be explained subsequently.

The junction point 40 is connected to an output lead 42 which, in turn, is connected to one end of a tank circuit 44. The tank circuit 44 includes a variable capacitor 46 and a variable inductor coil 48 connected in parallel between the output lead 42 and ground. The tank circuit 44 is tuned to a frequency *f* and has a sufficiently high Q to present a short circuit to signals at other frequencies. A coil 50 is inductively coupled to the inductor 48, the coil 50 having a small number of turns relative to the turns of the inductor coil 48 so as to provide a loose coupling thereto. One end of the coil 50 is grounded and the other end is connected to a lead 54 which is connected to an information source 56 by way of a resistor 58. The information source 56 supplies to the tank circuit 44 a binary information signal as shown by a waveform 60 having a first phase condition or a second phase condition 180 degrees out of phase from the first. As will be explained subsequently, the phase of the information signal of the waveform 60 determines the phase of the output signal as shown by a waveform 43 on the output lead 42. The information source 56 may be a source of binary information in a computer which operates by utilizing the phase relation of high frequency signals for transferring and storing binary information, for example.

The diodes of the reactance circuits 28 and 34 may be silicon type semiconductor diodes whose capacity can be varied in a non-linear manner by an externally applied bias voltage. As is well known, a semiconductor diode such as the diode 30 includes three zones, which are a *p* zone at the anode of the diode having an abundance of positive carriers, an *n* zone at the cathode of the diode having an abundance of negative carriers, and a thin depletion zone which is a junction between the *p* and *n* zones having relatively few carriers. Depending upon the bias condition, the diode will either conduct current in one direction or will act as a capacitor varying in capacitance with the applied potential. When the potential across the diode is positive on the anode or the *p* side of the junction and negative on the cathode or *n* side of the junction, the carriers bridge the depletion zone and form a conducting path. When the potential is reversed from the conducting condition so that the diode is reverse biased, the carriers are pulled away from the depletion zone and because the depletion zone is not bridged with carriers, it acts as the plates of a capacitor.

The greater the potential difference applied across the anode and cathode in a reverse bias direction, the farther the carriers are pulled away from the depletion zone and the lower is the capacity of the diode. As is also well known, the capacity of the diode when reverse biased varies in a non-linear manner in response to the applied potential. An example of diodes which may be utilized in the circuit of this invention are "Varicap" silicon junction diodes manufactured by Pacific Semiconductor's, Inc., Culver City, California.

The diodes of the reactance circuits 28 and 34 develop a bias between the diodes on the leads 33 and 37 which is determined by the amount of charge which each diode 30 and 32 or 36 and 38 has at any instant. The bias on the lead 33, for example, when the driving signal of waveform 22 is at its zero point is approximately the voltage corresponding to that when an equal charge is present in each diode. Also, the bias voltage on the lead 33 at the maximum or minimum peak of the driving signal is approximately equal to the peak voltage of the driving signal of the waveform 22 and the peak of the output signal of the waveform 43 impressed on the junction point 40. As will be discussed, one of the diodes 30 or 32 may conduct at the peaks of the driving signals if the charge leaks through the diode so as to bias into conduction the diode which is decreasing in bias potential and increasing in capacitance. However, except for this leakage condition, both diodes of each reactance circuit 28 or 34 present either an increasing or a decreasing capacitance.

Referring now to FIG. 1 and also to FIGS. 2 and 4 which respectively show waveforms developed by the circuit of FIG. 1 and the capacitance variation of the diodes in the reactance circuit such as 28, the operation of the circuit of this invention will be explained in further detail. The generator circuit 10 develops driving signals of the waveforms 22 and 24 which are of the same frequency but 180 degrees out of phase from each other to control the reactance circuits 28 and 34. The diodes 30, 32, 36 and 38 are all selected to have similar characteristics. As will also be explained, the variable reactance circuits 28 and 34 respond to the driving signals of the waveforms 22 and 24 to provide a capacitance variation at the junction point 40. Also, the variable reactance circuits 28 and 34 substantially cancel out voltage variations developed by the driving source at the junction point 40 because of leakage current of the diodes 32 and 38. The diagram of FIG. 4 shows a curve **65*a* and a curve 66*a*, representing the capacitance variation of diodes 32 and 30, respectively, in response to the driving signal of the waveform 22. The direction of capacitance variation of the curves 65*a* and 66*a* is opposite because the driving signal of the waveform 22 is applied to the cathode of the diode 30 and to the anode of the diode 32. The curve 65*a* has a zero point or a point of conduction of a voltage 67*a* and the curve 66*a* has a zero point or a point of conduction of a voltage 68*a*. The curves 65*a* and 66*a* are arranged in FIG. 4 by aligning the self-bias voltage points for each curve at a common voltage so that the capacitance variation of both diodes resulting from positive and negative alterations of the waveform 22** is relative to the common self-bias voltage.

For purposes of explanation, the operation of the circuit will first be explained when a signal is not applied to the junction point 40 from the tank current 44. When a positive-going alternation 23 of the waveform 22 is first impressed on the diodes 30 and 32, the diodes have an equal reverse bias potential and an equal capacitance. As the alternation 23 rises to its peak, in the positive direction, the diode 30 decreases in capacitance at a slow rate as shown by the curve **66*a* of FIG. 4 or with a small change of capacitance in response to the potential difference across the diode, and the diode 32 increases in capacitance at a high rate as shown by the curve 65*a* or with a large change of capacitance in response to the potential difference across the diode. This large increase of capacitance of the diode 32 is caused by the non-linear characteristics of the diode which provide a large capacitance change for a small voltage change in the region of a small potential difference across the diode in the reverse bias direction. The diodes also characteristically in the region of a large potential difference across a diode have a relatively small capacitance variation for a similar potential change across the diode in the operating region of a small potential difference across the diode in the reverse bias direction. It is to be noted that the charge distribution or self-bias between the diodes 30 and 32 maintains the diode 32 in a reverse bias condition. The large increase of capacitance of the diode 32 causes the capacitance value looking into the junction point 40 from the tank circuit 44 to decrease similar to a waveform 70*a* when the alternation 23 rises in potential. When the alternation 23 falls in potential, the diode 30 increases in capacitance with a relatively small change of capacitance as shown by the curve 66*a* and the diode 32 decreases in capacitance with a relatively large change of absolute capacitance as shown by the curve 65*a*. This large decrease of capacitance of the diode 32 causes the capacitance at the junction point 40 to increase from its low point similar to the capacitance curve shown by the waveform 70*a***.

At the same time, a negative-going alternation 25 of the waveform 24 is impressed on the diode 36. The fall of potential of the alternation 25 causes the diode 38 to be reverse biased with a relatively large potential difference and to have a relatively small capacitance change of the curve 65*a*. The diode 36 is reverse biased with a small potential difference because of the bias on the lead 37 as determined by the charge distribution between the diodes 36 and 38. The small potential difference applied across the diode 36, causes the diode 36 to vary with a relatively large capacitance change as shown by the curve 66*a*. As the alternation 25 falls to its minimum value, the diode 38 decreases in capacitance with a small change of capacitance and the diode 36 increases in capacitance with a relatively large change of capacitance, because of the non-linear voltage verses capacitance characteristics of the diodes, as discussed above. As the alternation 25 rises in potential, the diode 38 increases in capacitance with a relatively small change in capacitance value and the diode 36 decreases in capacitance with a relatively large change in capacitance value as controlled by the charge distribution between the diodes 36 and 38.

Therefore, during the occurrence of the alternations 23 and 25, the diode 32 has a relatively large variation in capacitance value and the diode 38 has a relatively small variation in capacitance value. Also, the diode 32 has a large capacitance and the diode 38 has a small capacitance. Thus, current flows between the diodes 32 and 38 as indicated by the arrow 35. It is to be noted that the leakage current between the diodes 32 and 38 maintains the junction point 40 substantially at ground potential.

When the alternation 29 is first impressed on the diodes 30 and 32, the diodes have an equal potential across each diode and have an equal capacitance value at the self-bias voltage of FIG. 4. When the alternation 29 falls in potential, the capacitance of the diode 30 increases with a relatively large change of capacitance of the curve 66*a* and the capacitance of the diode 32 decreases with a relatively small change of capacitance of the curve 65*a*. When the alternation 29 rises in potential, the diode 30 decreases in capacitance with a relatively large change of capacitance and the diode 32 increases in capacitance with a relatively small change of capacitance.

At the same time as the alternation 29 is impressed on the diode 30, the increase of potential of a positive alternation 31 of the waveform 24 is impressed on the diode 36. The diode 36 decreases in capacitance with a relatively small change of capacitance value of the curve 66*a* and the diode 38 increases in capacitance with a relatively large change of capacitance value of the curve 65*a*. This relative change of capacitance value results from the diode 36 operating close to its forward biased region and the diode 38 operating with a large bias in the reverse biased region. The diode 38 is thus operating in the region of capacitance where a small voltage change results in a relatively large capacitance change.

When the alternation 31 falls in potential, the diode 36 increases in capacitance with a relatively small change in capacitance of the curve 66*a* and the diode 38 decreases in capacitance with a relatively large change in capacitance value of the curve 65*a*. The capacitance developed in response to the alternations 29 and 31 varies in a manner similar to the waveform 70*a*. The sum of the capacitance variations from the two reactance circuits 28 and 34 which combine in series is shown as the unloaded capacitance variation of the waveform 70*a*. In response to the alternations 29 and 31, current flows from the small capacitance of the diode 32 to the large capacitance of the diode 38 opposite to the direction of the arrow 35.

It is to be noted that the diode of each reactance circuit which is increasing in capacitance, as discussed above, in response to the driving signal of the waveforms 22 and 24 may be biased into conduction at the maximum and minimum peaks of the driving signals.

Now that the balanced operation of the circuit resulting from the driving signals has been explained, the operation of the circuit will be explained to develop an output signal on the output lead 42. When the energy of an information signal of the waveform 60 is passed through the coil 50 and coupled to the inductor coil 48, the tank circuit 44 oscillates at the frequency and phase of the information signal. The information signal of the waveform 60 is at the same frequency as the driving signal of the waveforms 22 and 24 and in phase with one or the other of the two driving signals. Thus, in accordance with the invention, the informational signal of the waveform 60 is in phase with one driving signal or the other, the phase conditions representing binary information. It is to be noted that the information signal may also be at other frequencies, as will be discussed subsequently. The information signal may be of relatively short duration and of a small amplitude being only required to transfer sufficient energy to start oscillations of the tank circuit 44. Also, because of the small number of turns of the coil 50 and the high impedance of the resistor 58, there is a very small loss of energy into the information source 56 when the circuit is maintaining phase information by developing an output signal.

The signal developed by the tank circuit 44 as a result of the informational signal of the waveform 60 is then impressed through the junction point 40 to vary the capacitance of the reactance circuits 28 and 34, with the driving signals of the waveforms 22 and 24 being applied to the reactance circuits after the tank circuit 44 is energized so as to present a negative impedance condition to the tank circuit 44. Thus, the tank circuit 44 sees a conductance equal or greater in magnitude and opposite in sign to its own internal shunt conductance. Therefore, energy is supplied to the tank circuit 44 so as to increase the amplitude of the informational signals and to sustain the output signal developed therein as shown by the waveform 43 or a waveform 43*a* at the second phase condition.

The effect on the reactance circuits 28 and 34 of the signal developed by the tank circuit 44 as a result of the information signal of the waveform 60 introduced thereto, will now be explained. When the alternations 23 and 25 of the driving signals are impressed on the variable reactance circuits 28 and 34 with the diodes 30, 32, 36 and 38 acting as capacitors, and a positive-going alternation 45 across the waveform 43 is impressed on the junction point 40, an unbalanced voltage condition is developed between the reactance circuits 28 and 34. This condition results in a change of capacitance at the junction point 40.

In response to the alternation 45 of the signal developed by the tank circuit 44, the bias potential across the diodes 30 and 32 is decreased and the capacitance of these diodes is increased. At the same time the bias across diodes 36 and 38 is increased and their capacitance is decreased. However, the increase of capacitance of the diodes 30 and 32 is greater than the decrease of capacitance of diodes 38 and 36 because the net signal across diodes 30 and 32 is decreased while the net signal across diodes 36 and 38 is increased. Thus, during the alternation 45, an increase of capacitance is present at the junction point 40, and current flows from the reactance circuits 28 and 34 to the tank circuit 44 as shown by arrow 68.

In response to an alternation 47 developed by the tank circuit 44, an increase of capacitance is developed across the diodes 30 and 32 and a decrease of capacitance is developed across the diodes 36 and 38. The increase of capacitance across the diodes 30 and 32 is again greater than the decrease of capacitance across the diodes 36 and 38 because of the net signal changes across the pairs of diodes. In response to the negative-going alternation 47, current flows from the junction point 40 to the tank circuit 44 as shown by the arrow 68. The capacity increases across the diodes 30 and 32 in response to the alternations 45 and 47 because the bias on the lead 33 decreases while the bias on the lead 37 increases. It is to be noted that the operation of the circuit is similar but opposite if the informational signal applied to the tank circuit 44 is 180 degrees out of phase from the waveform 43.

The current signal developed in response to the alternations 45 and 47 includes a sub-harmonic of the capacity variation and all harmonics of that sub-harmonic. The capacitance variation, which may be expressed as $2f$ where $f$ is the frequency of the driving signals, results in a composite current signal on the lead 42. Because the tank circuit 44 is tuned to present a high impedance to current signals only at the fundamental frequency, $f$, for example, only the fundamental voltage signal, as shown by the positive alternation 45 of waveform 43, is developed on the output lead 42.

It is to be again noted that the capacity variation of the waveform 70*a* develops a negative resistance, which is an average resistance independent of time so as to provide an energy transfer from the generator source to the tank circuit 44, thus developing and sustaining the desired amplitude of the output signal of the waveform 43. Therefore, the circuit of FIG. 1 amplifies the signal impressed on the tank circuit 44. This type of energy transfer is explained in an article by H. Heffner and G. Wade entitled "Gain, Band Width, and Noise Characteristics of the Variable Parametric Amplifier" published in Journal of Applied Physics, September 1958.

To further understand the circuit of FIG. 1 a sequence of operation may be that the driving signals of the waveforms 22 and 24 are first discontinued or not applied to the reactance circuits 28 and 34. A small amount of energy of the waveform 60 is then introduced into the tank circuit 44 for a short period of time from the information source 56 at a selected first phase condition. Before this energy in the tank circuit 44 decays to the level of thermal noise, the driving signals of the waveforms 22 and 24 are respectively applied to the reactance circuits 28 and 34 causing a negative resistance to appear at the junction point 40 and at the tank circuit 44. The information energy in the tank circuit 44 is then amplified in response to the negative resistance to the saturation level of the tank circuit 44 to develop the output signal of the waveform 43, which condition is maintained at the first phase condition. If the information energy applied to the tank circuit is at a second phase condition, 180 degrees from the first, then the output signal resulting from the energy in the tank circuit 44 is at a different phase as shown by the waveform 43*a*.

The circuit of this invention may be utilized to generate output signals at the fundamental frequency of the driving signals or any harmonic of the frequency $2f$, which is the frequency of the capacitance variation as developed by the generator circuit 10. Output signals are developed at a desired frequency by changing the tuning of the tank circuit 44 and introducing informational signals at the tuned frequency. As discussed above the current signal of the waveform 70*a* includes a sub-harmonic frequency of the capacitance variation rates $2f$ and harmonics of that sub-harmonic. Thus, the output signal on the lead 42 may be at the frequency of the driving signals or sub-harmonic of the capacitance variation and may be expressed as:

$$\frac{2f}{n}$$

where $n=2$ or any larger integer. Because of the utilization of double diodes in the variable reactance circuits 28 and 34 so as to generate a capacitance variation at twice of the frequency of the driving signal, output signals may be developed at the fundamental frequency $f$ as well as at other frequencies. It is to be noted that a single reactance element as a diode for each reactance circuit would not develop an output signal at the fundamental frequency and would develop only sub-harmonics of $f$, its driving frequency. Thus, single element reactance circuits only develop signals at a frequency of $$\frac{f}{n}$$

where $n=2$ and higher integers.

Referring now to FIG. 3, which shows an alternate arrangement of the circuit of FIG. 1, the invention will be further described. The reactance circuits 28 and 34 are replaced by reactance circuits 72 and 82. The reactance circuit 72 includes a capacitor 73 having one plate coupled to the lead 16 and the other plate coupled to the anode of a diode 74. The diode 74 has its cathode coupled to the junction point 40. A capacitor 77 has one plate coupled to the lead 16 and the other plate coupled to a cathode of a diode 78 by way of a lead 79. The anode of the diode 78 is coupled to the junction point 40. Thus, the capacitor 73 and the diode 74 are connected in parallel to the capacitor 77 and the diode 78. The reactance circuit 82 includes a capacitor 83 having one plate coupled to the lead 18 and the other plate coupled to the cathode of a diode 84 through a lead 85. The reactance circuit 82 also includes a capacitor 87 having one plate coupled to the lead 18 and the other plate connected to an anode of a diode 88 through a lead 89. The cathode of the diode 88 is connected to the junction point 40. Thus, capacitor 87 and diode 88 are connected in parallel with the capacitor 83 and the diode 84. It is to be noted that the reactance circuits such as 72 may be arranged with one of the series of a diode and a capacitor reversed and with the capacitors both coupled to the anodes of the diodes. The diode 78 may have its cathode coupled to the lead 16 and its anode coupled to one end of the capacitor 77 with the other end of the capacitor 77 coupled to the junction point 40.

In operation, the reactance circuits 72 and 82 operate similar to the reactance circuits 28 and 34, except that a much larger amplitude of capacitance variation is generated because the capacitance of each reactance circuit add in parallel rather than in series. Also the reactance circuits 72 and 82 develop a charge distribution and a bias between each capacitor and diode instead of between two diodes as shown in FIG. 1.

For purposes of explanation, the reactance circuits 72 and 82 will first be explained without a signal being impressed on the junction point 40 from the tank circuit 44. The capacitance variation shown in FIG. 4 also applies to each reactance circuit of the parallel diode arrangement of FIG. 3 because the self-bias voltages developed on the leads 75 and 79, for example, are equal as a result of the similarity of the diodes so that the curves 65*a* and 66*a* are arranged in FIG. 4 with a common self-bias voltage. The capacitance increase or decrease of the curves 65*a* and 66*a* is opposite in response to an alternating voltage applied to the reactance circuit 72 similar to the circuit of FIG. 1, because the signal of the waveform 22 is applied to the anode of the diode 74 and to the cathode of the diode 78. When the alternation 23 is impressed on the reactance circuit 72, the diode78 is reverse biased with a large potential difference and develops a small capacitance change of the curve 66*a*. The diode 74 is reverse biased with only a small potential difference, the reverse bias condition resulting from the bias on the lead 75 as determined by the charge distribution between the capacitor 73 and the diode 74. Thus, as the alternation 23 rises in potential, the diode 74 has a relatively large increase of capacitance value of the curve 65*a* and the diode 78 has a relatively small decrease of capacitance value of the curve 66*a*. In response to the fall of potential of the alternation 23, the diode 74 has a relatively large decrease of capacitance value of the curve 65*a* and the diode 78 has a relatively small increase of capacitance value of the curve 66*a*. The capacitance developed by the alternation 23 has a shape similar to the unloaded capacitance of a waveform 64. Because the diodes 74 and 78 are coupled in parallel, the capacitance thereof is combined in parallel. For example, in response to the alternation 23, the diode 78 is decreasing in capacitance and the diode 74 is increasing in capacitance, which capacitances are combined in parallel to form a capacitance variation similar to that of the waveform 64. The reactance circuit 82 varies in capacitance in a similar but opposite manner in response to the alternation 25 with the diode 84 having a larger capacitance variation than the diode 88. The increase and decrease of capacitance of the reactance circuits 72 and 82 is combined in series at the junction point 40 to form a capacitance variation of the waveform 64. In response to the alternations 29 and 31, the reactance circuits vary in capacitance in a similar manner except the diodes 78 and 88 have the largest change of capacitance value.

The capacitance variation at the junction point 40 is much larger for the circuit of FIG. 3 where the diodes are arranged in parallel because the current distribution between the diodes 74 and 78 does not limit the capacitance developed by each diode. The capacitors such as 73 and 77, for example, operate as biasing capacitors so as to separately control the capacitance of the diodes 74 and 78. In response to the driving signals of the waveforms 22 and 24, current passes between the diodes 74 and 78 and between the diodes 84 and 88 when the diodes have equal characteristics.

When a signal similar to the waveform 43 is applied to the junction point 40 from the tank circuit 44, current signals flow between the reactance circuits 72 and 82 and the tank circuit 44 to present a negative impedance to the tank circuit 44, similar to the reactance circuits of FIG. 1. The tank circuit 44 is energized prior to applying the driving signals to the reactance circuits 72 and 82 similar to the discussion relative to FIG. 1. The total current signal passed on the lead 42 of FIG. 3 includes current signals at the same frequencies as in FIG. 1. The impedance of the tank circuit 44 at the tuned frequency develops an output signal similar to the waveform 43 or 43*a* except at quadrature relative to the phase of the driving signal such as the waveform 22 in response to the current signals. The output signals on the lead 42 of FIG. 3 is at phase quadrature relative to the driving signal because the capacitive peaks of the waveform 64 occurs at the peaks of the alternations of the waveform 22 rather than at the 0 voltage as in FIG. 1. The circuit of FIG. 3 is useful, for example, when it is desired to utilize diodes having a relatively large value of capacitance.

Thus, there has been described a bi-stable circuit which may be utilized to retain phase information at high frequencies in response to an information signal. The device utilizes double diode reactance circuits so as to develop an output signal at the same frequency of the driving signal or at any desired sub-harmonic of the capacitance variation frequency which is twice the frequency of the driving signals. The circuit transfers energy from the driving source so that a first or a second phase condition may be introduced from a low amplitude signal.

I claim:

1. A memory circuit for developing an output signal at a desired frequency and at a similar phase to that of an informational signal at the same frequency, said circuit comprising: a source of driving signals at a selected frequency, reactance means at non-linear reactance vs. voltage characteristics coupled to said source of driving signals to both develop therefrom and provide a reactance variation having a frequency of repetition twice that of said selected frequency, a tank circuit coupled to said reactance means and resonant at a desired frequency of output signal, and an informational source coupled to said tank circuit for applying signals thereto, whereby said tank circuit oscillates and applies a potential variation to said reactance means to develop and maintain an output signal.

2. A circuit comprising: driving means for developing alternating driving signals at a first frequency, variable capacitive means coupled to said driving means for both developing and providing therefrom a capacitance variation at a second frequency twice the frequency of said first frequency, said capacitive means having non-linear capacitance vs. voltage characteristics, oscillating means coupled to said capacitive means and selectively tuned to said first frequency and to all harmonic frequencies of said first frequency, and a control source coupled to said oscillating means to apply a control signal at said first frequency and at a desired phase to cause said oscillating means to oscillate and control said variable capacitance means to receive energy from said driving means and thereby develop an output signal at said first frequency and at said desired phase.

3. A bi-stable circuit comprising: source means providing first and second driving signals of opposite phase relation and at a selected frequency; reactance means having non-linear reactance vs. voltage characteristics coupled to said source means for both developing therefrom and providing a reactance variation at twice said selected frequency, said reactance means including first and second reactance circuits each having one end coupled to said source means with each reactance circuit including series-connected first and second diodes having non-linear reactance vs. voltage characteristics; a resonant circuit having one end coupled to said reactance circuit and tuned to said selected frequency; and a source of informational signals at said selected frequency having a selective first and second phase and coupled to said resonant circuit, said informational signals controlling said resonant circuit to generate signals and control said reactance circuits to present a negative impedance to said resonant circuit, the signals developed by said reactance circuit being amplified and sustained at the selected phase and selected frequency of said informational signal.

4. A circuit for responding to a source of information signals having a selected first and second phase and a fundamental frequency to develop output signals at one of said selected phases and at the fundamental frequency, said circuit comprising: generator means for developing a first and second driving signal 180 degrees out of phase from each other and at the fundamental frequency; reactance means having non-linear reactance vs. voltage characteristics coupled to said generator means for both developing therefrom and providing a reactance variation at twice said fundamental frequency, said reactance means including a first and second reactance circuit each having a first and a second end with said first end coupled to said generator means, said reactance circuits each including a first and a second diode coupled in series and in opposite polarity, said first and second diodes having non-linear capacitance vs. voltage characteristics; and a tank circuit coupled between the second end of said reactance circuits and said potential source and coupled to said source of information signals, said informational signals energizing said tank circuit to develop a voltage variation to further control said reactance means to transfer energy from said reactance means to said tank circuit so that said tank circuit develops the output signals.

5. A circuit comprising: generator means for developing first and second driving signals 180 degrees out of phase from each other at respective first and second terminals and at a predetermined frequency; reactance means having non-linear reactance vs. voltage characteristics coupled to said generator means for both developing therefrom and providing a reactance variation of twice said predetermined frequency, said reactance means comprising a first reactance circuit including a first and second diode having their anodes coupled together and a cathode of said first diode coupled to said first terminal, and a second reactance circuit including first and second diodes having their anodes coupled together and a cathode of said first diode coupled to said second terminal, said diodes of said first and second reactance circuits having non-linear capacitance vs. voltage characteristics; a tank circuit including a capacitor and an inductor each having one end coupled to the cathodes of each of said second diodes and having the other end coupled to said generator means, said tank circuit being tuned to present a high impedance to signals at said predetermined frequency; and a source of informational signals coupled to said inductor for transferring informational signals thereto at said predetermined frequency, said tank circuit oscillating to develop voltage signals at said predetermined frequency for controlling the capacitance of said diodes so as to present a negative impedance to said tank circuit to maintain said voltage signals.

6. A circuit comprising: a driving source for providing first and second driving signals at the same frequency but at different phases; reactance means having non-linear reactance vs. voltage characteristics coupled to said driving source for both developing therefrom and providing a reactance variation at twice the driving signal frequency, said reactance means including a junction point, a first and a second reactance circuit each having a non-linear reactance vs. voltage characteristic, with one end of each reactance circuit coupled to said driving source for receiving therefrom one of said driving signals and the other end of each said reactance circuit coupled to said junction point; a tank circuit for developing an output signal coupled between said junction point and said driving source, said tank circuit being resonant at a desired frequency of said output signal; and a source of informational signals selectively having a first phase and a second phase 180 degrees out of phase from said first phase coupled to said tank circuit for energizing said tank circuit to control said reactance circuits and present a negative impedance to said tank circuit, and to develop said output signal at the resonant frequency of said tank circuit and at the phase of said informational signals.

7. A circuit for developing output signals at a phase corresponding to a control signal comprising: a source of alternating driving signals having a first and a second terminal providing respective first and second driving signals, said driving signals being at a first frequency; reactance means having non-linear reactance vs. voltage characteristics coupled to said source for both developing therefrom and providing a reactance variation at twice said first frequency, said reactance means including a first reactance circuit having non-linear capacitance vs. voltage characteristics and also having a first and a second end with its said first end coupled to said first terminal, and a second reactance circuit having non-linear capacitance vs. voltage characteristics and also having a first and a second end with its said first end coupled to said second terminal, said second ends of said reactance circuits being coupled to a common point; and a tank circuit coupled between said common point and said source and coupled to a source of control signals at said first frequency and harmonics of said first frequency, said tank circuit being tuned to the same frequency as said control signals, said tank circuit oscillating in response to said control signals to control the potential at said common point whereby said reactance circuits transfer energy to said tank circuit to amplify and sustain the oscillation of said tank circuit and develop the output signals.

8. A circuit comprising generator means for developing first and second driving signals 180 degrees out of phase from each other at respective first and second outputs; reactance means having non-linear reactance vs. voltage characteristics coupled to said generator means for both developing therefrom and providing a reactance variation at twice the frequency of said driving signals, said reactance means comprising first and second reactance circuits each including a first capacitor and a first diode the latter having non-linear capacitance vs. voltage characteristics, a second capacitor and a second diode the latter having non-linear capacitance vs. voltage characteristics, with one end of said first capacitor and an anode of said first diode coupled together and one end of said second capacitor and the cathode of said second diode coupled together, said other ends of said capacitors in said first reactance circuit coupled to said first output and said other ends of said capacitors in said second reactance circuit coupled to said second output, a cathode end of said first diode and a cathode end of said second diode of said reactance circuits coupled together to provide a junction point; a tank circuit coupled between said junction point and said generator means and tuned to a desired frequency; and a source of informational signals having a selected first and second phase coupled to said tank circuit for transferring energy thereto, said tank circuit applying voltage oscillations to said junction point so as to control said reactance circuits to develop a negative impedance and transfer energy to said tank circuit to amplify and sustain the oscillations of said tank circuit.

9. A circuit for developing alternating output signals at a preselected frequency and at a phase corresponding to the phase of control signals, said circuit comprising: a first source of alternating signals at said preselected frequency, reactance means having non-linear reactance vs. voltage characteristics coupled to said first source for both developing therefrom and providing a reactance variation at twice said preselected frequency, a tank circuit coupled to said reactance means and tuned to said preselected frequency, and a second source of alternating signals at the same frequency as said first source coupled to said tank circuit for introducing control signals thereto to control said reactance variation and develop alternating output signals at said preselected frequency and at the phase of said control signals.

10. A circuit comprising: source means for providing at one end thereof a first alternating driving signal of a preselected frequency and for providing at the other end thereof a second alternating driving signal of said preselected frequency and 180° out of phase from said first alternating driving signal; reactance means having non-linear reactance vs. voltage characteristics coupled to said source means for both developing therefrom and providing a reactance variation at twice said preselected frequency, said reactance means including first and second diodes coupled together to form a first series circuit with one end of said series circuit coupled to said one end of said source means, and third and fourth diodes connected together to form a second series circuit with one end of said second series circuit coupled to said other end of said source means, each said diode having a non-linear capacitance vs. voltage characteristic, the other ends of said series circuits being connected together to form a junction point; a tank circuit tuned to said preselected frequency and coupled to said junction point; and a source of control signals at a preselected phase and at said preselected frequency coupled to said tank circuit for energizing said tank circuit to develop output signals at said preselected frequency and having the same phase as said control signals.

References Cited in the file of this patent

UNITED STATES PATENTS

| | | |
|---|---|---|
| 2,555,959 | Curtis | June 5, 1951 |
| 2,719,223 | Van Der Ziel | Sept. 27, 1955 |
| 2,854,651 | Kircher | Sept. 30, 1958 |
| 2,925,562 | Firestone | Feb. 16, 1960 |

FOREIGN PATENTS

| | | |
|---|---|---|
| 561,323 | Great Britain | May 15, 1944 |
| 778,883 | Great Britain | July 10, 1957 |

OTHER REFERENCES

Publication: Electrical Manufacturing, December 1954, pages 83–88, 300 and 302, "Voltage-Sensitive Capacitors."

UNITED STATES PATENT OFFICE

CERTIFICATE OF CORRECTION

Patent No. 3,109,934 November 5, 1963

Don R. Holcomb

It is hereby certified that error appears in the above numbered patent requiring correction and that the said Letters Patent should read as corrected below.

Column 9, line 64, for "at" read -- having --; line 67, for "having" read -- at --; column 10, line 3, for "developing and providing therefrom" read -- developing therefrom and providing --.

Signed and sealed this 28th day of April 1964.

(SEAL)
Attest:

ERNEST W. SWIDER
Attesting Officer

EDWARD J. BRENNER
Commissioner of Patents